(12) United States Patent
Chung et al.

(10) Patent No.: US 11,119,608 B2
(45) Date of Patent: Sep. 14, 2021

(54) ELECTRONIC DEVICE INCLUDING OPTICAL SENSOR USING FRESNEL LENS

(71) Applicant: Samsung Electronics Co., Ltd., Gyeonggi-do (KR)

(72) Inventors: Sohyun Chung, Gyeonggi-do (KR); Yongjin Lee, Gyeonggi-do (KR); Younghyun Kim, Gyeonggi-do (KR); Inho Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/373,116

(22) Filed: Apr. 2, 2019

(65) Prior Publication Data

US 2019/0324593 A1    Oct. 24, 2019

(30) Foreign Application Priority Data

Apr. 2, 2018 (KR) .................. 10-2018-0038206

(51) Int. Cl.
*G06F 3/042* (2006.01)
*G06F 1/16* (2006.01)
*H04N 5/225* (2006.01)

(52) U.S. Cl.
CPC .......... *G06F 3/0421* (2013.01); *G06F 1/1605* (2013.01); *G06F 1/1626* (2013.01); *G06F 1/1686* (2013.01); *H04N 5/2254* (2013.01)

(58) Field of Classification Search
CPC ................................ A61B 5/08; A61B 5/1455
See application file for complete search history.

(56) References Cited

U.S. PATENT DOCUMENTS

| | | | |
|---|---|---|---|
| 5,130,531 A | * | 7/1992 | Ito .............................. G01V 8/14 250/216 |
| 7,751,054 B2 | | 7/2010 | Backes |
| 7,804,055 B2 | | 9/2010 | Backes |
| 8,138,465 B2 | | 3/2012 | Aldiek |

(Continued)

FOREIGN PATENT DOCUMENTS

| | | |
|---|---|---|
| CN | 101339124 | 1/2009 |
| CN | 101359059 | 2/2009 |

(Continued)

OTHER PUBLICATIONS

International Search Report dated Jul. 18, 2019 issued in counterpart application No. PCT/KR2019/003817, 7 pages.

(Continued)

*Primary Examiner* — Sepehr Azari
(74) *Attorney, Agent, or Firm* — The Farrell Law Firm, P.C.

(57) ABSTRACT

An electronic device is provided. The electronic device includes a housing that includes a sensing surface, a light emitting unit that outputs a light through the sensing surface, a light receiving unit that collects a reflection light reflected from an external object in contact with the sensing surface, after the light is output from the light emitting unit, and a first Fresnel lens that is disposed between the light receiving unit and the sensing surface. A first surface of the first Fresnel lens total reflects the reflection light introduced in a direction perpendicular to the sensing surface, and a second surface of the first Fresnel lens refracts the total reflected light so as to be introduced to the light receiving unit.

13 Claims, 15 Drawing Sheets

(56) References Cited

U.S. PATENT DOCUMENTS

| | | |
|---|---|---|
| 8,269,202 B2 | 9/2012 | Backes |
| 9,270,854 B2 | 2/2016 | Lee et al. |
| 10,024,517 B2 | 7/2018 | Miyashita et al. |
| 10,215,698 B2 | 2/2019 | Han et al. |
| 2007/0235638 A1 | 10/2007 | Backes et al. |
| 2008/0297803 A1 | 12/2008 | Backes |
| 2009/0032689 A1* | 2/2009 | Backes .............. B60S 1/0822 250/227.24 |
| 2009/0101791 A1 | 4/2009 | Aldiek |
| 2009/0261237 A1* | 10/2009 | Backes .............. B60S 1/0837 250/227.11 |
| 2013/0088430 A1* | 4/2013 | Lee .................... G06F 3/0304 345/158 |
| 2014/0204592 A1 | 7/2014 | Miyashita et al. |
| 2016/0058312 A1 | 3/2016 | Han et al. |
| 2017/0164848 A1* | 6/2017 | Nadeau .............. A61B 5/0008 |
| 2017/0325698 A1* | 11/2017 | Allec ................. A61B 5/0205 |
| 2017/0325744 A1 | 11/2017 | Allec et al. |
| 2019/0086331 A1 | 3/2019 | Han et al. |
| 2019/0090806 A1* | 3/2019 | Clavelle ............. G04G 9/0088 |

FOREIGN PATENT DOCUMENTS

| | | |
|---|---|---|
| EP | 2 743 740 | 6/2014 |
| JP | 2007155575 | 6/2007 |
| JP | 2008141152 | 6/2008 |
| KR | 1020010073935 | 8/2001 |
| KR | 101080963 | 11/2011 |

OTHER PUBLICATIONS

European Search Report dated Mar. 17, 2021 issued in counterpart application No. 19781768.7-1020, 8 pages.

Chinese Office Action dated Jul. 23, 2021 issued in counterpart application No. 201980023724.9, 20 pages.

\* cited by examiner

ELECTRONIC DEVICE INCLUDING OPTICAL SENSOR USING FRESNEL LENS

CROSS-REFERENCE TO RELATED APPLICATION(S)

This application is based on and claims priority under 35 U.S.C. § 119 to Korean Patent Application Serial No. 10-2018-0038206, filed on Apr. 2, 2018, in the Korean Intellectual Property Office, the entire disclosure of which is incorporated herein by reference.

BACKGROUND

1. Field

The present disclosure relates generally to an electronic device including an optical sensor using a Fresnel lens.

2. Description of Related Art

An electronic device such as a smartphone or a tablet personal computer may perform various functions such as a call function, an Internet search function, and a health care function. The electronic device may execute an application to provide a variety of information to a user.

Also, the electronic device may be equipped with various sensors to collect information of an ambient environment or information (e.g., biometric information) about the user. The electronic device may apply the collected information to the execution of an application. Nowadays, an electronic device that is equipped with an optical sensor for collecting biometric information (e.g., fingerprint information, heartbeat information, or iris information) of the user is being launched.

An electronic device according to the related art includes an isolator between a light emitting unit and a light receiving unit when being equipped with an optical sensor for collecting biometric information of the user. The isolator may prevent a light emitted from the light emitting unit from being introduced to the light receiving unit without reflection by an external object. When the isolator is disposed, a mounting space of the optical sensor increases.

Also, when the light emitting unit generates non-directional photons, the output photons may be scattered without directivity, thereby causing a decrease in the amount of photons introduced to the light receiving unit. This means that the efficiency with which the sensor receives a light decreases.

SUMMARY

The present disclosure has been made to address at least the disadvantages described above and to provide at least the advantages described below.

In accordance with an aspect of the present disclosure, an electronic device is provided. The electronic device may include a housing that includes a sensing surface, a light emitting unit that outputs a light through the sensing surface, a light receiving unit that collects a reflection light reflected from an external object in contact with the sensing surface, after the light is output from the light emitting unit, and a first Fresnel lens that is disposed between the light receiving unit and the sensing surface. A first surface of the first Fresnel lens total reflects the reflection light introduced in a direction perpendicular to the sensing surface, and a second surface of the first Fresnel lens refracts the total reflected light so as to be introduced to the light receiving unit.

In accordance with an aspect of the present disclosure, an electronic device is provided. The electronic device may include a housing including a sensing surface, a light emitting unit configured to output a light through the sensing surface, a light receiving unit configured to collect a reflection light reflected from an external object in contact with the sensing surface, after the light is output from the light emitting unit, and a first Fresnel lens disposed between the light emitting unit and the sensing surface. A first surface of the first Fresnel lens refracts the light generated from the light emitting unit, and a second surface of the first Fresnel lens total reflects the refracted light so as to be emitted to be perpendicular to the sensing surface.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
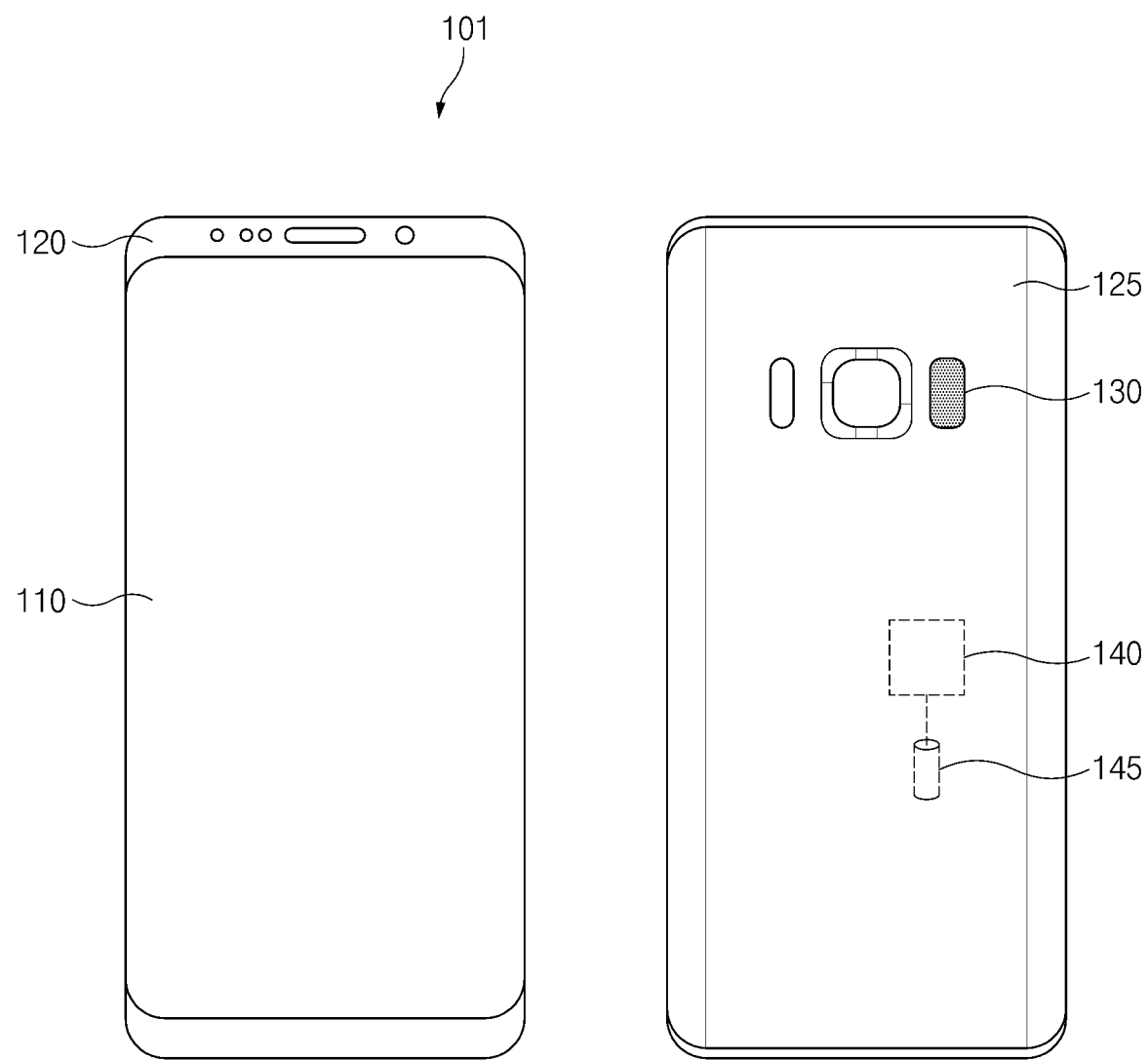
FIGS. 1A and 1B are diagrams of an electronic device, according to an embodiment.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

Figure 1B:
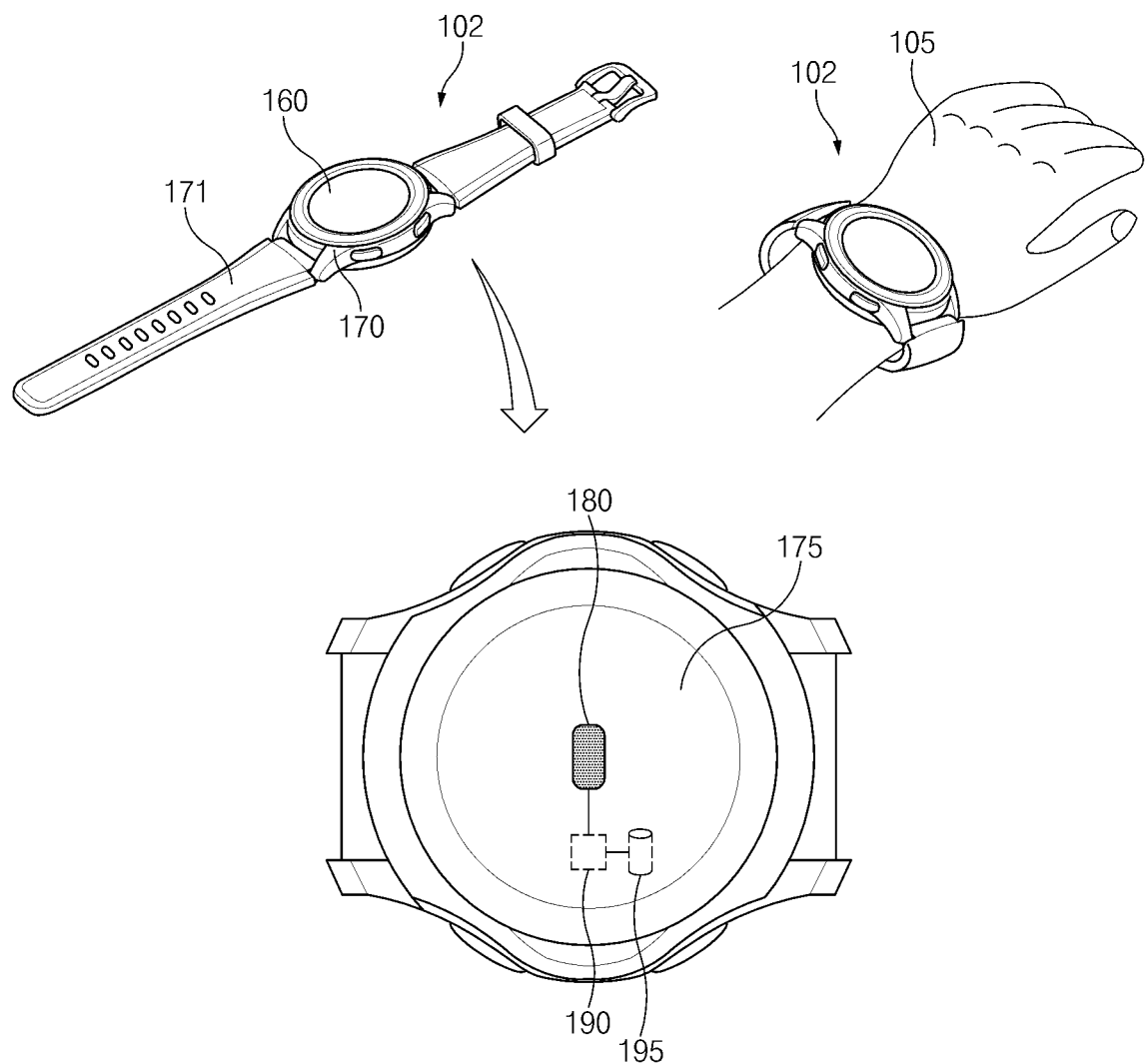

FIGS. 1A and 1B are diagrams of an electronic device, according to an embodiment.

Although an electronic device 101 and an electronic device 102 are illustrated as a smartphone and a smart watch in FIGS. 1A and 1B, the disclosure is not limited thereto. The electronic device 101 may be a tablet personal computer (PC) or a laptop PC. The electronic device 102 may be a wearable device (e.g., a smart band, a smart necklace, or a smart glass).

Referring to FIG. 1A, the electronic device 101 includes a display 110 and a housing (or body) 120.

The display 110 may output content such as a text or an image. When a health care (or management) application is executed, the display 110 may display a user interface associated with the application. Also, the display 110 may display heartbeat information or blood pressure information of a user.

The housing (or body) 120 may fix the display 110 and may protect various components included in the housing 120. The housing 120 may include an optical sensor 130, a processor 140, a memory 145, and a communication circuit, which are necessary to drive the electronic device 101.

The optical sensor 130 may include a light emitting unit and a light receiving unit. The light emit part may output a light to the outside. The light receiving unit may receive a light reflected by the external object and may convert the received light to an electrical signal. The light receiving unit may provide a collected signal to the processor 140. The optical sensor 130 may be mounted on a back surface 125 of the electronic device 101. When the user touches his/her finger on the optical sensor 130, the optical sensor 130 may emit a light to the finger of the user and may collect biometric information of the user.

The optical sensor 130 may include a Fresnel lens that supports total reflection of a light incident perpendicularly to a sensing surface (or a sensor window or a cover member), at the light emitting unit or the light receiving unit. When the Fresnel lens is disposed at the light emitting unit, a light that is emitted to the outside may be in the form of a collimated light. When the Fresnel lens is disposed at the light receiving unit, light concentration may become higher.

The processor 140 may process various data processing and operations for the purpose of driving the electronic device 101. The processor 140 may execute an application and may display an execution screen associated with the application in the display 110.

The processor 140 may receive information collected through the optical sensor 130. The processor 140 may analyze the collected information to provide a variety of information to the user. The processor 140 may execute a health care application to display heartbeat information or blood pressure information of the user measured through the optical sensor 130. The processor 140 may provide workout information or diet information based on the biometric information of the user.

The memory 145 may store various data that are generated in the process of driving the electronic device 101. The memory 145 may store the biometric information of the user collected through the optical sensor 130.

Referring to FIG. 1B, the electronic device 102 includes a display 160, a housing (or body) 170, and a strap 171.

The display 160 may output content such as a text or an image. When a health care application is executed, the display 160 may display a user interface associated with the application. Also, the display 160 may display heartbeat information or blood pressure information of a user.

The housing (or body) 170 may fix the display 160 and may protect various components included in the housing 170. The housing 170 may include an optical sensor 180, a processor 190, a memory 195, and a communication circuit, which are necessary to drive the electronic device 102. The housing 170 may include a structure that is connectable with the strap 171.

Operations of the optical sensor 180, the processor 190, and the memory 195 are the same as or identical to the operations of the optical sensor 130, the processor 140, and the memory 145.

The optical sensor 180 may be mounted on a back surface 175 of the electronic device 102. When the user wears the electronic device 102 on his/her wrist, the optical sensor 180 may emit a light to the wrist of the user and may collect biometric information of the user.

The strap 171 (or a fixing part or a fastening part) 171 may fix the electronic device 102 to a portion (e.g., a wrist) 105 of the body of the user. The strap 171 may include a first portion and a second portion having fastening structures corresponding to each other. The strap 171 may be connected to the housing 170.

Figure 2A:
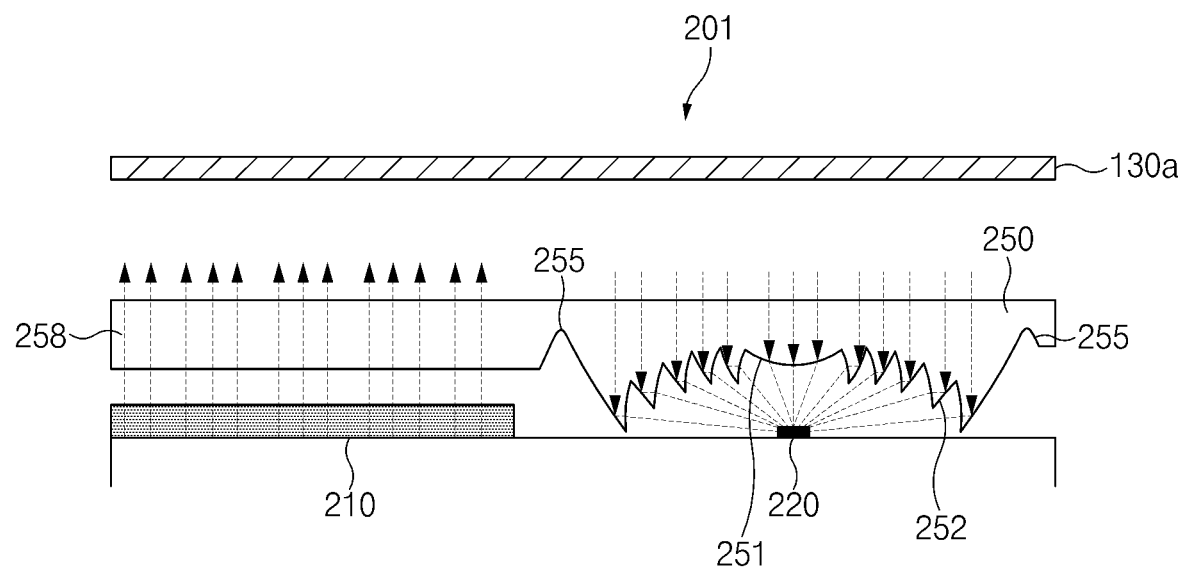
FIGS. 2A, 2B and 2C are diagrams of an optical sensor including a Fresnel lens, according to an embodiment.
Figure 2B:
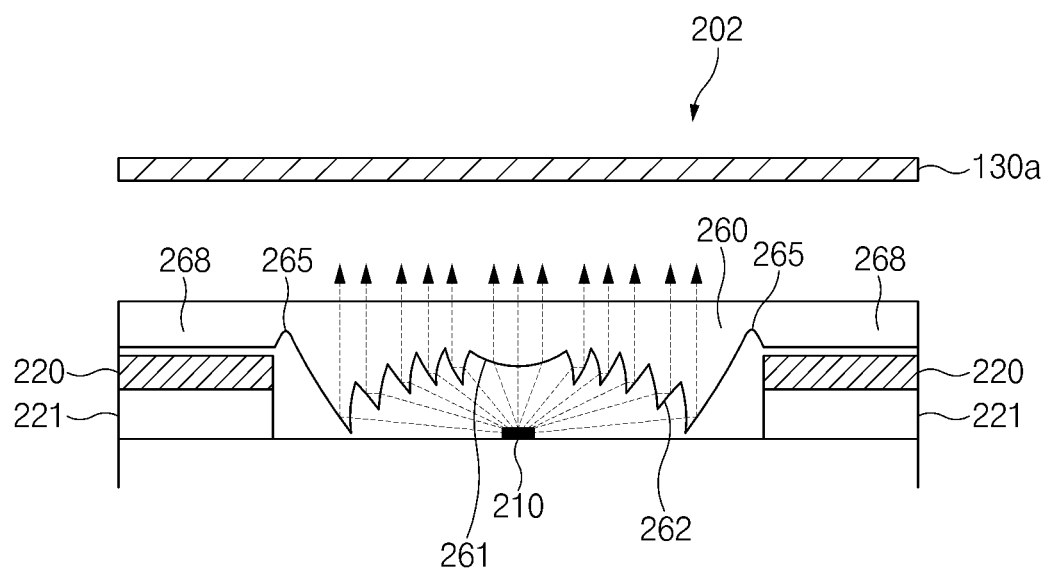
Figure 2C:
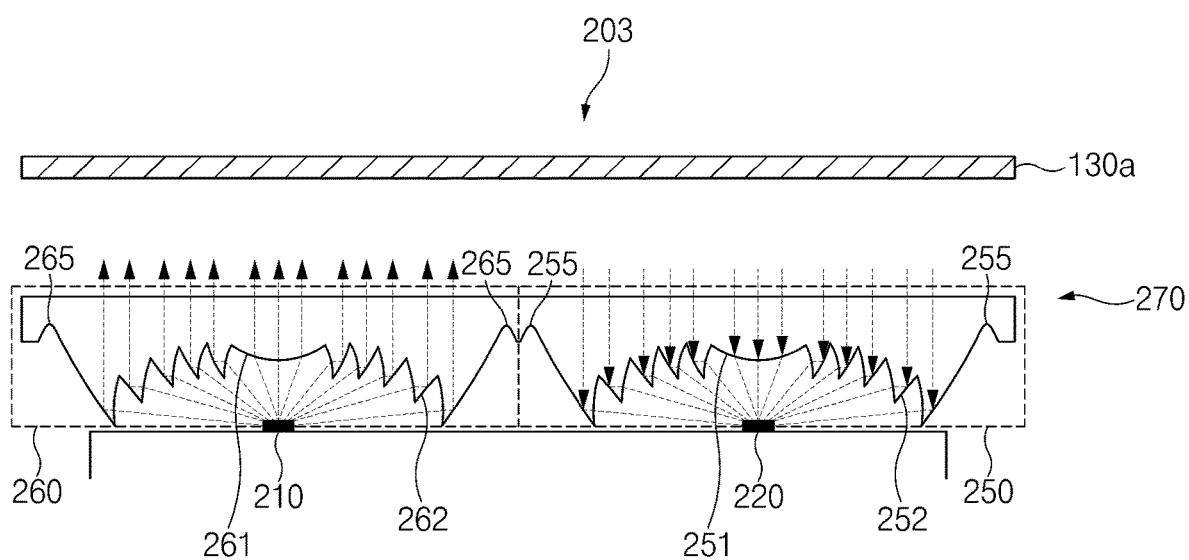

FIGS. 2A to 2C are diagrams of an optical sensor including a Fresnel lens, according to an embodiment.

Referring to FIG. 2A, an optical sensor 201 (e.g., the optical sensor 130 of FIG. 1A or the optical sensor 180 of FIG. 1B) includes a light emitting unit 210, a light receiving unit 220, and a Fresnel lens 250 for light reception. The light emitting unit 210 may generate an infrared light. The light emitting unit 210 may output a collimated light. The light that is generated from the light emitting unit 210 may be emitted to the outside through a sensing surface 130a.

The light receiving unit 220 may collect a light incident from the outside and may convert the collected light to an electrical signal. The light receiving unit 220 may collect a light (hereinafter referred to as a "reflection light") that is reflected by an external object (e.g., a body of the user) after being emitted from the light emitting unit 210 and may convert the collected light to an electrical signal. The light receiving unit 220 may provide a collected signal to the processor 140 or 190 in the electronic device 101 or 102.

The light emitting unit 210 and the light receiving unit 220 may be disposed on the same plane. In another embodiment, the light emitting unit 210 and the light receiving unit 220 may be disposed on different planes, respectively. The light emitting unit 210 may protrude more than the light receiving unit 220 in a direction facing the sensing surface 130a.

The Fresnel lens 250 for light reception may be disposed above the light receiving unit 220 (e.g., between the sensing surface 130a and the light receiving unit 220). The Fresnel lens 250 for light reception may total reflect and refract the reflection light reflected by the external object (e.g., a body of the user) so as to be induced to the light receiving unit 220. The Fresnel lens 250 for light reception may prevent a light passing through the sensing surface 130a from being scattered to a peripheral area in an electronic device, thus improving a light transfer efficiency and an object recognition efficiency. The Fresnel lens 250 for light reception may absorb photons in an area wider than the light receiving unit 220 so as to be transferred to the light receiving unit 220. This may allow the light receiving unit 220 of the narrow area to collect photons in a relatively wide range. The Fresnel lens 250 for light reception may be formed of a poly methyl methacrylate (PMMA), acryl, or glass material.

The Fresnel lens 250 for light reception may include a center lens 251 and a sawtooth lens 252. The center lens 251 may be disposed in a center area of the Fresnel lens 250 for light reception. The center lens 251 may be similar in shape to a general convex lens. A center point of the center lens 251 and a center point of the light receiving unit 220 may be aligned on a normal perpendicular to the sensing surface 130*a*.

The sawtooth lens 252 may be disposed around the center lens 251. The sawtooth lens 252 may be in the form of a circular arc surrounding the center lens 251. As a distance from the center lens 251 increases, a circular arc of the sawtooth lens 252 may become larger. The sawtooth lens 252 may include a plurality of sawtooth lenses, and may be symmetric with respect to the central point of the center lens 251. The sawtooth lens 252 may protrude toward the light receiving unit 220.

Through total reflection and refraction, the sawtooth lens 252 may induce a reflection light incident perpendicularly to the sensing surface 130*a* to the light receiving unit 220.

The Fresnel lens 250 for light reception may include a notch 255. The notch 255 may be in the form of a groove that is formed on a surface, which faces the light receiving unit 220, of the Fresnel lens 250 for light reception. The notch 255 may prevent a light output from the light emitting unit 210 from being introduced directly to the light receiving unit 220 without reflection by an external object (cross-talk).

An extension 258 of the Fresnel lens 250 for light reception may be disposed between the light emitting unit 210 and the sensing surface 130*a*. The extension 258 may be integrally formed with the Fresnel lens 250 for light reception. The Fresnel lens 250 may transmit a light generated from the light emitting unit 210.

Referring to FIG. 2B, an optical sensor 202 (e.g., the optical sensor 130 of FIG. 1A or the optical sensor 180 of FIG. 1B) includes the light emitting unit 210, the light receiving unit 220, and a Fresnel lens 260 for light emission. The Fresnel lens 260 for light emission may be disposed above the light emitting unit 210 (e.g., between the sensing surface 130*a* and the light emitting unit 210). The Fresnel lens 260 for light emission may total reflect and refract a light generated by the light emitting unit 210 so as to be incident perpendicularly to the sensing surface 130*a*.

A general Fresnel lens may change a direction of an output light up to maximally 45 degrees. In contrast, the Fresnel lens 260 for light emission, which supports total reflection, may change a direction of an output light up to maximally about 90 degrees. As such, a collimated light (or a parallel light) may be incident perpendicularly to the sensing surface 130*a*. When the collimated light (or the parallel light) is output, it may be easy to measure scattering by an object targeted for measurement. When the propagation of the light is changed to travel in a straight line, the degree of absorption and scattering due to compositions in a human body may be measured more easily by the light receiving unit 220. Also, when the Fresnel lens 260 for light emission is applied to a light emitting unit of a distance sensor (e.g., a time of flight (ToF) sensor), the Fresnel lens 260 for light emission may be used to measure a distance from an object, thus improving the performance of photographing.

The Fresnel lens 260 for light emission may include a center lens 261 and a sawtooth lens 262. The center lens 261 may be disposed in a center area of the Fresnel lens 260 for light emission. The center lens 261 may be similar in shape to a general convex lens. In an embodiment, a center point of the center lens 261 and a center point of the light emitting unit 210 may be aligned on a normal perpendicular to the sensing surface 130*a*.

The sawtooth lens 262 may be disposed in the form of a circular arc surrounding the center lens 261. As a distance from the center lens 261 increases, a circular arc of the sawtooth lens 262 may become larger. The sawtooth lens 262 may include a plurality of sawtooth lenses, and may be symmetric with respect to the central point of the center lens 251. The sawtooth lens 262 may protrude toward the light emitting unit 210.

Through refraction and total reflection, the sawtooth lens 262 may convert a light generated by the light emitting unit 210 to a light perpendicular to the sensing surface 130*a*. In one sawtooth lens 262, as an output light is refracted at a first surface (an internal surface) and is total reflected at a second surface (an external surface), the output light may be converted to the light perpendicular to the sensing surface 130*a*.

The Fresnel lens 260 for light emission may include a notch 266. The notch 266 may be in the form of a groove that is formed on a surface, which faces the light emitting unit 210, of the Fresnel lens 260 for light emission. The notch 266 may prevent a light output from the light emitting unit 210 from being introduced directly to the light receiving unit 220 without reflection by an external object (cross-talk).

An extension 268 of the Fresnel lens 260 for light emission may be disposed between the light receiving unit 220 and the sensing surface 130*a*. The extension 268 may be integrally formed with the Fresnel lens 260 for light emission. The Fresnel lens 260 may transmit a reflection light introduced from the outside.

The light emitting unit 210 and the light receiving unit 220 may be disposed on different planes, respectively. The light receiving unit 220 may further protrude in a direction facing the sensing surface 130*a*. A separate support member 221 may be disposed under the light receiving unit 220. When the light receiving unit 220 further protrudes in the direction facing the sensing surface 130*a*, a light transfer efficiency may be improved.

Referring to FIG. 2C, an optical sensor 203 (e.g., the optical sensor 130 of FIG. 1A or the optical sensor 180 of FIG. 1B) includes the light emitting unit 210, the light receiving unit 220, and a plurality of Fresnel lenses 270 (including the Fresnel lens 250 for light reception and the Fresnel lens 260 for light emission).

When the Fresnel lens 250 for light reception and the Fresnel lens 260 for light emission are integrally formed is illustrated in FIG. 2C, but the disclosure is not limited thereto. The Fresnel lens 250 for light reception and the Fresnel lens 260 for light emission may be separately formed and disposed.

Functions or operations of the light emitting unit 210, the light receiving unit 220, the Fresnel lens 250 for light reception, and the Fresnel lens 260 for light emission may be the same as or similar to the functions or operations of the corresponding components of FIG. 2A or 2B.

When the Fresnel lens 260 for light emission and the Fresnel lens 250 for light reception are respectively applied to the light emitting unit 210 and the light receiving unit 220, a signal-to-noise ratio may be higher than that of the optical sensor 201 of FIG. 2A or the optical sensor 202 of FIG. 2B.

The Fresnel lens 260 for light emission and the Fresnel lens 250 for light reception may protrude in the same direction. Both the Fresnel lens 260 for light emission and the Fresnel lens 250 for light reception may protrude in a direction facing away from the sensing surface 130*a*.

When the sensing surface 130*a* and the Fresnel lenses 250 and 260 are separated is illustrated in FIGS. 2A to 2C, but the disclosure is not limited thereto. The sensing surface 130a and the Fresnel lenses 250 and 260 may be in contact with each other.

Figure 3:
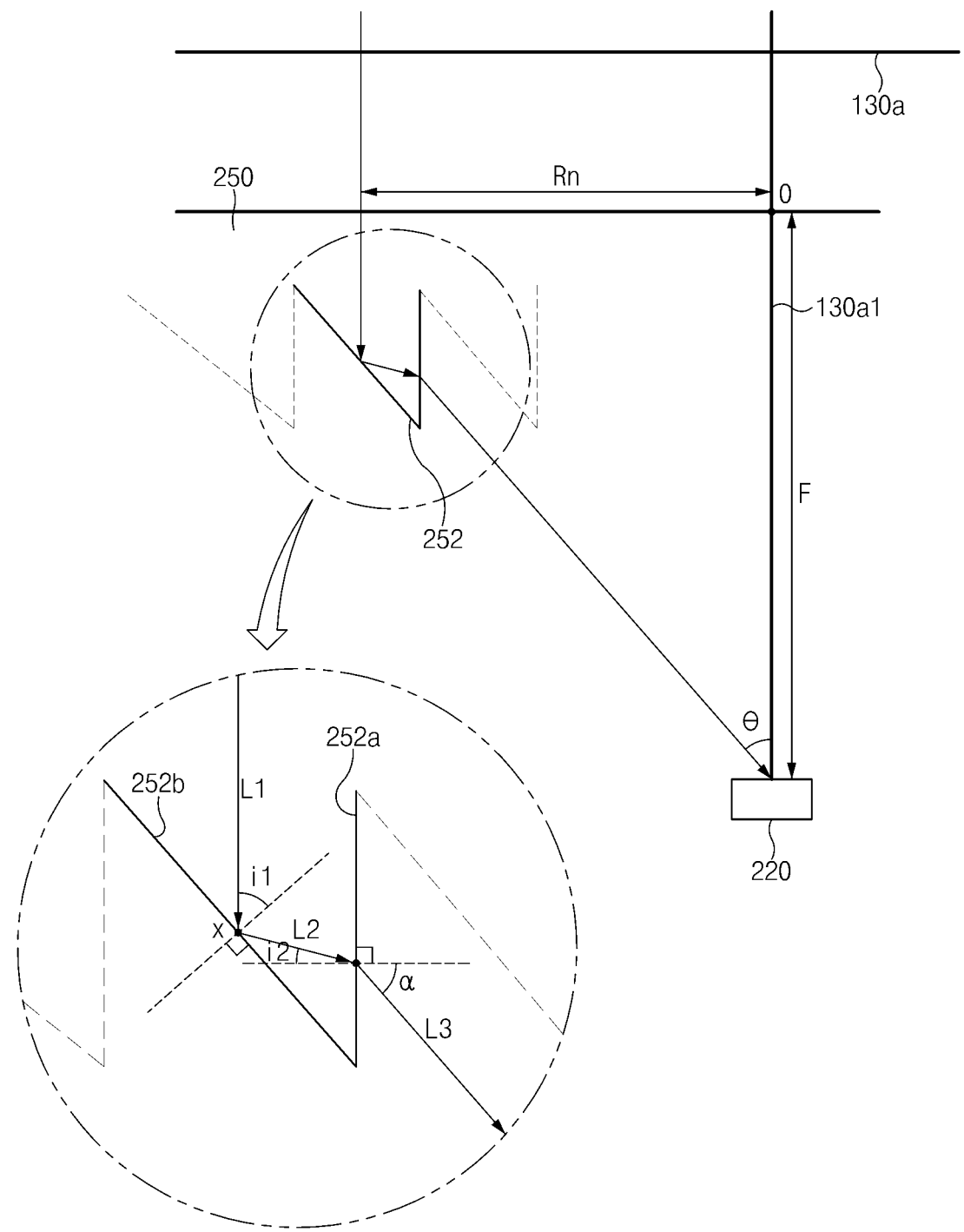
FIG. 3 is a diagram of light traveling in a sawtooth lens of a Fresnel lens, according to an embodiment.

FIG. 3 is a diagram of light traveling in a sawtooth lens of a Fresnel lens, according to an embodiment. Although FIG. 3 illustrates a reflection light incident to a light receiving unit, the disclosure is also applicable to a light generated from a light emitting unit. In a light emitting unit and a Fresnel lens for light emission, a travel path of a light may be opposite to a travel path illustrated in FIG. 3.

Referring to FIG. 3, the Fresnel lens 250 for light reception may be disposed above the light receiving unit 220 (e.g., between the sensing surface 130a and the light receiving unit 220). The Fresnel lens 250 for light reception may total reflect and refract a reflection light L1 reflected by an external object (e.g., a body of the user) so as to be induced to the light receiving unit 220. A center point "0" of the Fresnel lens 250 for light reception and a center point of the light receiving unit 220 may be aligned on a normal perpendicular to the sensing surface 130a.

The Fresnel lens 250 for light reception may include one or more sawtooth lenses 252. The sawtooth lens 252 may include an internal surface 252a relatively close to the center point "0" of the Fresnel lens 250 for light reception and an external surface 252b relatively distant from the center point "0".

The internal surface 252a may form a first angle with the sensing surface 130a. The external surface 252b may form a second angle with the sensing surface 130a. The first angle may be greater than the second angle.

An incident light L1 (having an incidence angle i1) incident perpendicularly to the sensing surface 130a may be total reflected at the external surface 252b. When using the Fresnel lens 250 for light reception, which is formed of a poly methyl methacrylate (PMMA) material, a refractive index of the sawtooth lens 252 may be about 1.49. Because a refractive index of air is "1", the incidence angle i1 of the incident light L1 perpendicular to the sensing surface 130a is greater than about 42 degrees, the total reflection may occur at the external surface 252b.

A placement angle, a length, or a curvature of the external surface 252b may be determined based on a material characteristic (e.g., a refractive index) of the Fresnel lens 250 for light reception and a distance Rn between the sawtooth lens 252 and the center point "0".

When the reflection light L1 is total reflected at the external surface 252b, the incident light L1 may be induced toward the internal surface 252a without being output to the outside of the sawtooth lens 252.

The internal surface 252a may refract a light L2 (having an incidence angle i2) total reflected at the external surface 252b (at a refraction angle of a) so as to be induced to the light receiving unit 220. A placement angle, a length, or a curvature of the internal surface 252a may be determined based on the material characteristic (e.g., a refractive index) of the Fresnel lens 250 for light reception and the distance Rn between the sawtooth lens 252 and the center point "0".

A refracted light L3 may be introduced to the light receiving unit 220 and may then be converted to an electrical signal.

A value of a convergent angle Θ between a normal 130a1 of the sensing surface 130a and the light L3 refracted through the internal surface 252a may vary with the incidence angle i1. Through the convergent angle Θ, an angle between the internal surface 252a and the external surface 252b of the sawtooth lens 252 that total reflects the incident light L1 may also be determined.

A relationship between an incidence angle and a reflection angle may be determined by Equation 1 and Equation 2 below:

$$i1 = \tan^{-1}\frac{\tan\Theta}{\left(n(\sqrt{1+\tan\Theta^2})-1\right)} \quad (1)$$

$$i2 = \sin^{-1}\frac{1}{\left(n(\sqrt{1+\tan\Theta^2})\right)} \quad (2)$$

When the first incidence angle i1 is about 42 degrees, the convergent angle Θ of the Fresnel lens 250 for light reception may be about 54.59 degrees, and the second incidence angle i2 may be about 22.95. Here, tan(Θ) may be determined by the distance Rn between the external surface 252b of the sawtooth lens 252 and the center point "0" of the Fresnel lens 250 for light reception and a focal distance "F" of the Fresnel lens 250 for light reception (tan(Θ)=Rn/F).

When the first incidence angle i1 is greater than about 42 degrees, the total reflection may occur at the external surface 252b of the Fresnel lens 250 for light reception, which is formed of the PMMA material. In the Fresnel lens 250 for light reception, which is formed of the PMMA material, an angle between the internal surface 252a and the external surface 252b of the sawtooth lens 252 or a shape of the internal surface 252a and the external surface 252b may be determined by using the convergent angle Θ that is calculated when the first incidence angle i1 is greater than about 42 degrees.

When using the Fresnel lens 250 for light reception formed of a poly methyl methacrylate (PMMA) material, when tan(Θ)>1.4, the total reflection may occur at the external surface 252b.

Figure 4:
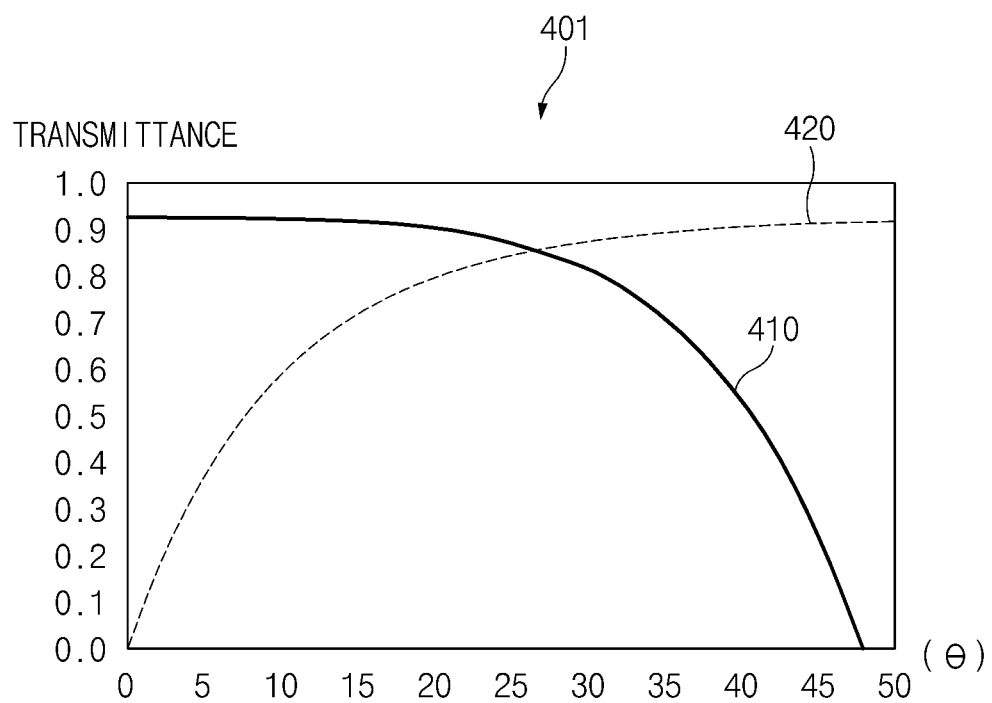
FIG. 4 is a diagram of transmittance of a lens according to a convergent angle $\Theta$ of a Fresnel lens for light reception, according to an embodiment.

FIG. 4 is a diagram of transmittance of a lens according to a convergent angle Θ of a Fresnel lens for light reception, according to an embodiment.

Referring to FIG. 4, light transmittance of a general Fresnel lens 410 and light transmittance of a Fresnel lens 420 that supports total reflection may vary with a convergent angle Θ. When the convergent angle Θ is not greater than about 30 degrees, the light transmittance of the general Fresnel lens 410 may be greater than the light transmittance of the Fresnel lens 420 supporting total reflection. In contrast, when the convergent angle Θ is not smaller than about 30 degrees, the light transmittance of the Fresnel lens 420 supporting total reflection may be greater than the light transmittance of the general Fresnel lens 410. When using the Fresnel lens 420 supporting total reflection in a mounting environment in which the convergent angle Θ is not smaller than about 30 degrees, a light transfer efficiency may increase.

Figure 5:
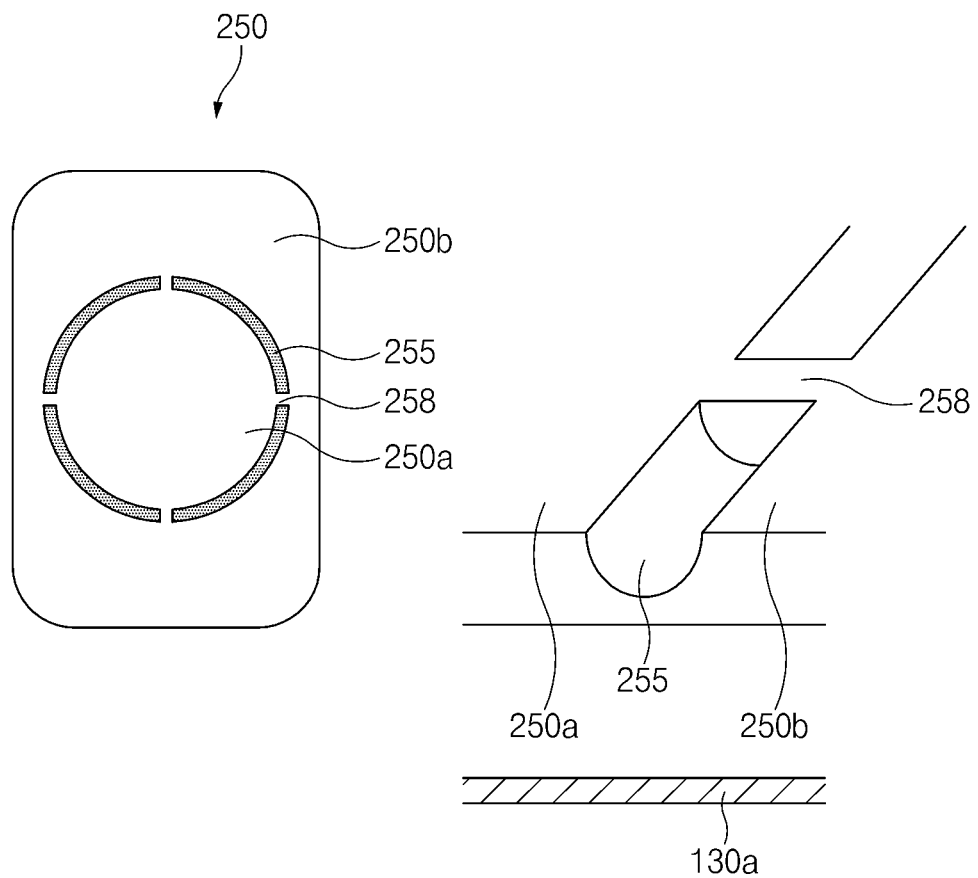
FIG. 5 is a diagram of a structure of a notch formed in a Fresnel lens, according to an embodiment.

FIG. 5 is a diagram of a structure of a notch formed in a Fresnel lens, according to an embodiment. In FIG. 5, a description will be given with respect to the Fresnel lens 250 for light reception, but the description may also be applied to the Fresnel lens 260 for light emission.

Referring to FIG. 5, the Fresnel lens 250 for light reception includes the notch 255, which prevents a light output from the light emitting unit 210 from being introduced directly to the light receiving unit 220 without reflection by an external object (cross-talk).

The notch 255 may be disposed between a center area 250a and a peripheral area 250b of the Fresnel lens 250 for light reception. The notch 255 may be in the form of a circle or a circular arc surrounding the center area 250a. The notch 255 may be in the form of a groove that is formed on a surface, which faces the light receiving unit 220, of the Fresnel lens 250 for light reception.

The Fresnel lens 250 may include a support structure 258 (or a portion, in which a groove is not formed, of the notch 255). The support structure 258 may separate the notch 255. The support structure 258 may prevent the Fresnel lens 250 for light reception from be damaged when the notch 255 is formed. The support structure 258 may be formed parallel to a surface, which faces the light receiving unit 220, of the Fresnel lens 250 for light reception. The support structure 258 may be a portion where the notch 255 is not formed and the center area 250a and the peripheral area 250b are connected flatwise.

Figure 6:
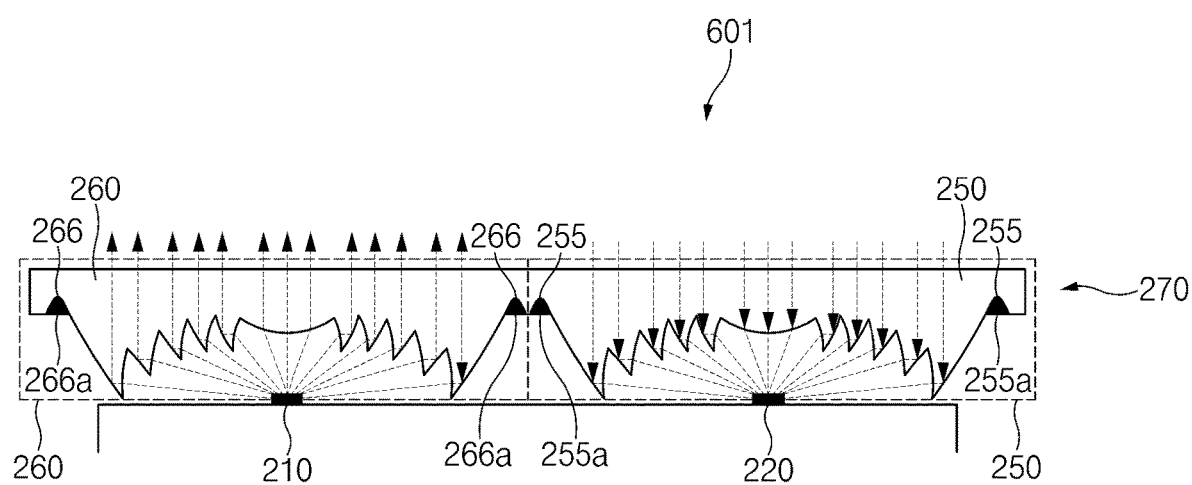
FIG. 6 is a diagram of an example in which a reinforcement material is inserted in a notch, according to an embodiment.

FIG. 6 is a diagram of an example in which a reinforcement material is inserted in a notch, according to an embodiment.

Referring to FIG. 6, an optical sensor 601 (e.g., the optical sensor 130 of FIG. 1A or the optical sensor 180 of FIG. 1B) includes the light emitting unit 210, the light receiving unit 220, and a plurality of Fresnel lenses 270 (including the Fresnel lens 250 for light reception and the Fresnel lens 260 for light emission).

The Fresnel lens 260 for light emission and the Fresnel lens 250 for light reception may be integrally formed.

The Fresnel lens 260 for light emission and the Fresnel lens 250 for light reception may include the notch 266 and the notch 255, respectively. The notches 266 and 255 formed in the Fresnel lens 260 for light emission and the Fresnel lens 250 for light reception may be integrated to form one groove.

The notches 255 and 266 may prevent a light output from the light emitting unit 210 from being introduced directly to the light receiving unit 220 without reflection by an external object (cross-talk).

The notches 255 and 266 may be filled with reinforcement materials 255a and 266a of a good light absorption rate. The notches 255 and 266 may be filled all or partially with the reinforcement materials 255a and 266a.

Figure 7:
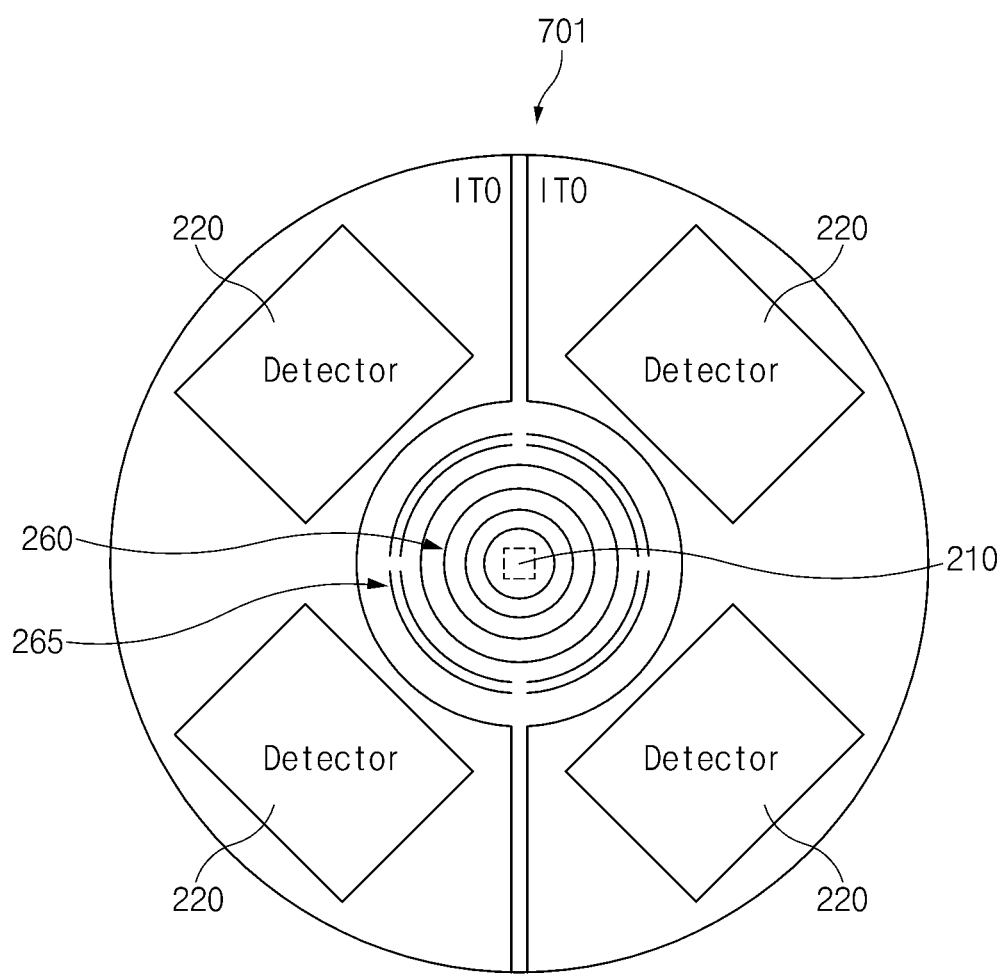
FIG. 7 is a diagram of a layout of an optical sensor including one light emitting unit and a plurality of light receiving units, according to an embodiment.

FIG. 7 is a diagram of a layout of an optical sensor including one light emitting unit and a plurality of light receiving units, according to an embodiment.

Referring to FIG. 7, an optical sensor 701 (e.g., the optical sensor 130 of FIG. 1A or the optical sensor 180 of FIG. 1B) includes one light emitting unit 210, the Fresnel lens 260 for light emission, and a plurality of light receiving units 220 (e.g., detectors).

The light emitting unit 210 may be disposed in a central portion of the optical sensor 701. The light emitting unit 210 may be in the form where a plurality of small light sources are combined. The Fresnel lens 260 for light emission may be disposed above the light emitting unit 210 (or a surface of the light emitting unit 210, from which a light is output or which faces a sensing surface).

The Fresnel lens 260 for light emission includes the notch 266. The notch 266 may be disposed between the light emitting unit 210 and each of the light receiving units 220.

The plurality of light receiving units 220 may convert a reflection light, which is reflected by an external object after being generated from the light receiving unit 220, to an electrical signal. The plurality of light receiving units 220 may collect different reflection lights based on positions where the light receiving units 220 are disposed. A processor may collect biometric information of the user by comparing information collected by each light receiving unit 220 and position information of each light receiving unit 220 and analyzing comparison results.

A separate isolator for light isolation may not be disposed between the light emitting unit 210 and the plurality of light receiving units 220. A characteristic of a light traveling in a straight line may be improved through the Fresnel lens 260 for light emission, thus reducing the probability of direct introduction to the light receiving units 220 adjacent thereto. Also, the notch 266 may make light isolation easy, and thus, the crosstalk of light may be reduced.

A distance between the light emitting unit 210 and the plurality of light receiving units 220 may be shorter than when an isolator is disposed, and a space where the optical sensor 701 is mounted may be reduced.

One or more indium tin oxide (ITO) electrodes may be formed in the Fresnel lens 260. An indium tin oxide (ITO) electrode that is a transparent film may transmit a light. The ITO electrode may be connected to at least one of a touch sensor, an electrocardiogram (ECG) sensor, or a body fat mass/skeletal muscle mass (or bioelectrical impedance analysis (BIA)) sensor, through a conductive line. When a plurality of ITO electrodes are provided, a capacitance may be formed between the ITO electrodes. The touch sensor, the ECG sensor, or the body fat mass/skeletal muscle mass (or BIA) sensor may sense a change in the capacitance between the ITO electrodes to recognize whether a touch is made by a portion of a body of the user. Various sensing information may be collected. The ECG sensor or the body fat mass/skeletal muscle mass (or BIA) sensor may connect one ITO electrode to (+) terminal and the other electrode to (−) terminal of power source to measure the electrocardiogram (ECG) or the body fat mass/skeletal muscle mass.

Figure 8:
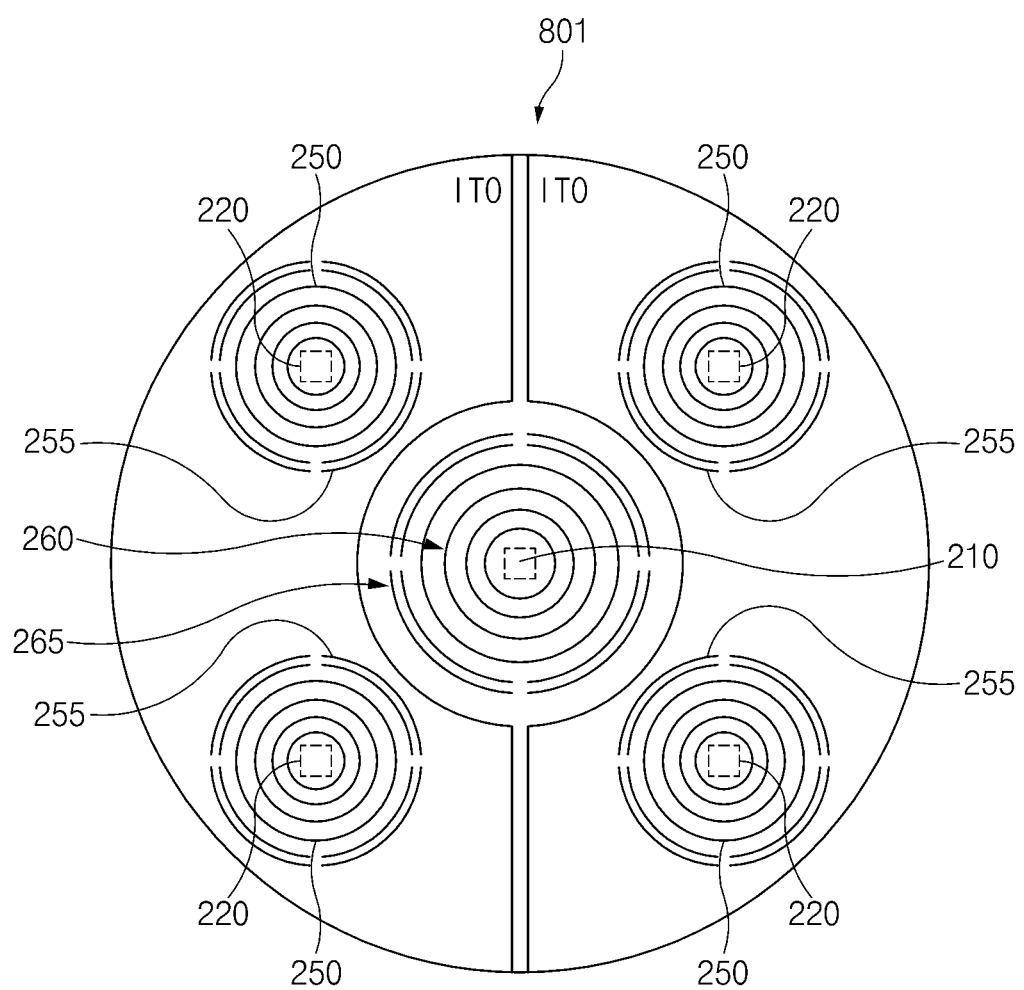
FIG. 8 is a diagram of an optical sensor including a Fresnel lens at each of a light emitting unit and a light receiving unit, according to an embodiment.

FIG. 8 is a diagram of an optical sensor including a Fresnel lens at each of a light emitting unit and a light receiving unit, according to an embodiment.

Referring to FIG. 8, an optical sensor 801 (e.g., the optical sensor 130 of FIG. 1A or the optical sensor 180 of FIG. 1B) includes the Fresnel lenses 250 for light reception, which correspond to the plurality of light receiving units 220, unlike the optical sensor 701 of FIG. 7. Each Fresnel lens 250 for light reception may include the notch 255.

When a Fresnel lens is applied to each of the light emitting unit 210 and the light receiving unit 220, a light transfer efficiency may be improved. The Fresnel lens 260 for light emission corresponding to the light emitting unit 210 may change a light generated from the light emitting unit 210 to a collimated light so as to be induced maximally to a sensing surface. The Fresnel lens 250 for light reception of the light receiving unit 220 may concentrate a light reflected by an external object into the light receiving unit 220, thus making light collection of the light receiving unit 220 easy. This may mean that a signal-to-noise ratio is maximized.

Figure 9:
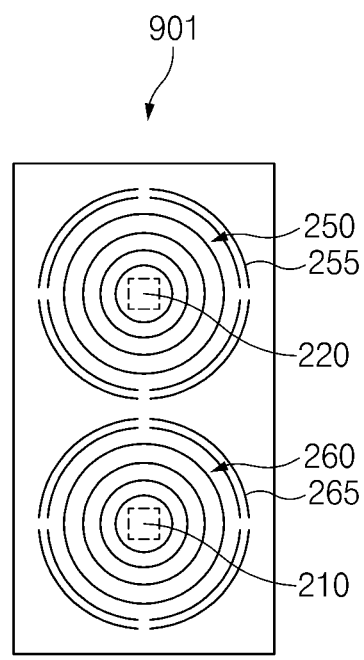
FIG. 9 is a diagram of an optical sensor including one light emitting unit and one light receiving unit, according to an embodiment.

FIG. 9 is a diagram of an optical sensor including one light emitting unit and one light receiving unit, according to an embodiment.

Referring to FIG. 9, an optical sensor 901 (e.g., the optical sensor 130 of FIG. 1A or the optical sensor 180 of FIG. 1B) includes one light emitting unit 210, the Fresnel lens 260 for light emission, one light receiving unit 220, and the Fresnel lens 250 for light reception. The Fresnel lens 260 for light emission and the Fresnel lens 250 for light reception may include the notch 266 and the notch 255, respectively.

The optical sensor 901 may include one light emitting unit 210 and one light receiving unit 220 and may be mounted in a smaller space than the optical sensors 701 and 801 of FIGS. 7 and 8. The light emitting unit 210 and the light receiving unit 220 may be installed without a separate isolator, and thus, a mounting efficiency may be improved.

The optical sensor 201 may be installed in a wearable device, which has a relatively small mounting space, such as a smart necklace or a smart ring.

Figure 10:
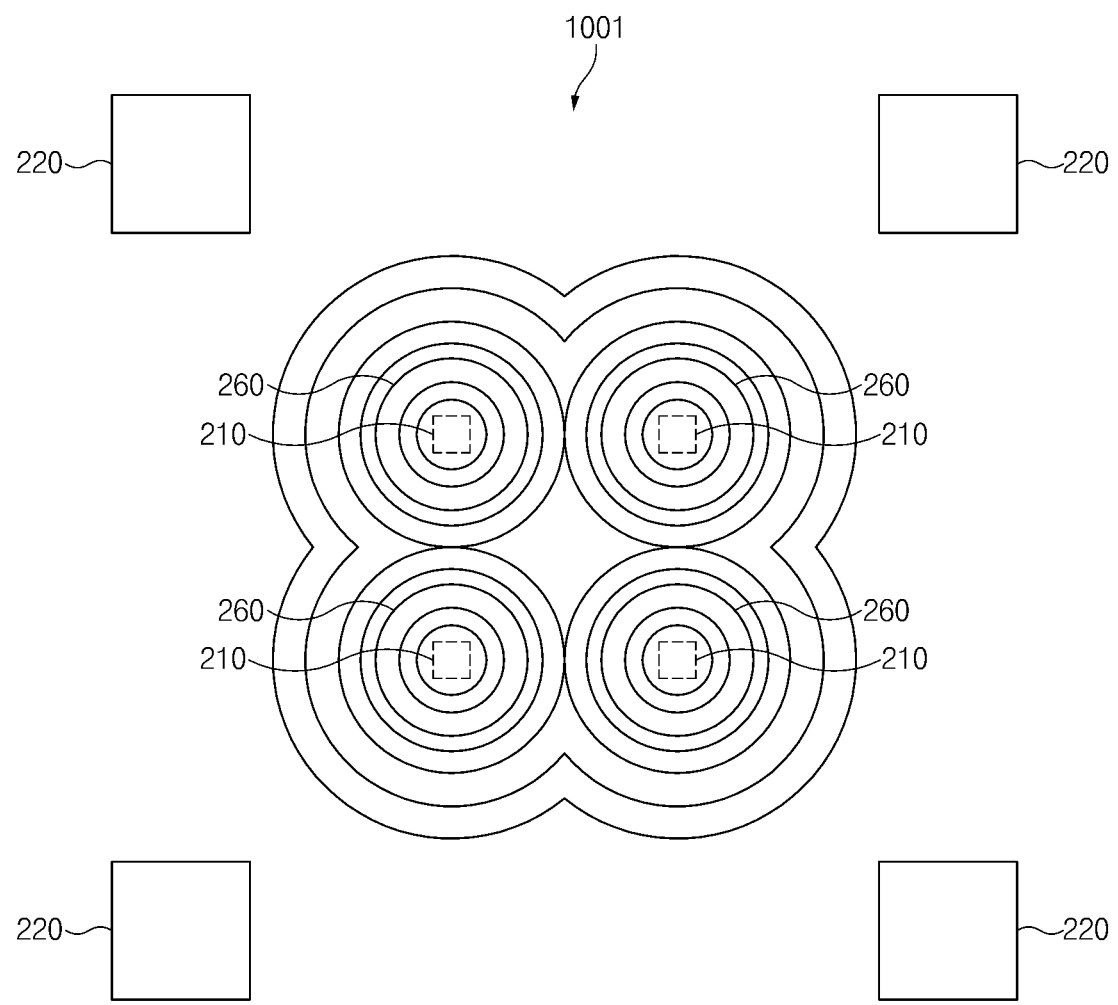
FIG. 10 is a diagram of an optical sensor including a Fresnel lens at each of a plurality of light emitting units, according to an embodiment.

FIG. 10 is a diagram of an optical sensor including a Fresnel lens at each of a plurality of light emitting units, according to an embodiment.

Referring to FIG. 10, the plurality of light emitting units 210 may be arranged in a specified shape (e.g., in a tetragonal or triangular shape). The Fresnel lens 260 for light emission may be disposed at each of the plurality of light emitting units 210.

Lights emitted from the plurality of light emitting units 210 through the Fresnel lenses 260 for light emission may be reflected by an external object and may be transferred to the plurality of light receiving units 220 adjacent thereto. Each of the plurality of light receiving units 220 may receive a light generated from the light emitting unit 210 adjacent thereto as a reflection light of the highest intensity.

Figure 11:
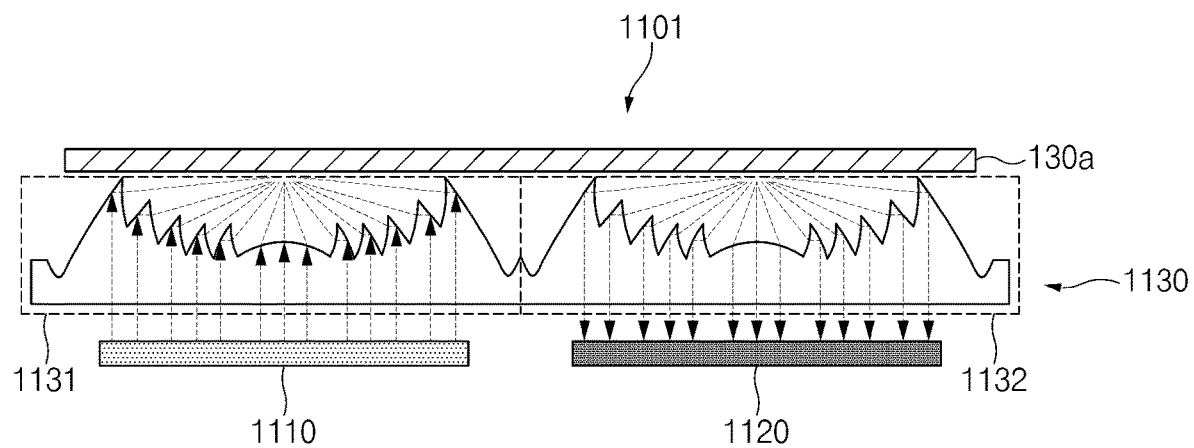
FIG. 11 is a diagram of an example in which a Fresnel lens faces a sensing surface, according to an embodiment.

FIG. 11 is a diagram an example in which a pattern surface of a Fresnel lens faces a sensing surface, according to an embodiment.

Referring to FIG. 11, an optical sensor 1101 (e.g., the optical sensor 130 of FIG. 1A or the optical sensor 180 of FIG. 1B) includes a light emitting unit 1110, a light receiving unit 1120, and a plurality of Fresnel lenses 1130 (including a Fresnel lens 1131 for light emission and a Fresnel lens 1132 for light reception).

The light emitting unit 1110 may generate an infrared light. The light emitting unit 1110 may output a collimated light. The light that is generated from the light emitting unit 1110 may be emitted to the outside through the sensing surface 130a.

The light receiving unit 1120 may collect a light incident from the outside and may convert the collected light to an electrical signal. The light receiving unit 1120 may collect a reflection light reflected by an external object (e.g., a body of the user) after being emitted from the light emitting unit 1110 and may convert the collected light to an electrical signal.

The Fresnel lens 1131 for light emission may be disposed above the light emitting unit 1110 (e.g., between the sensing surface 130a and the light emitting unit 1110). A sawtooth-shaped pattern surface of the Fresnel lens 1131 for light emission may be disposed to face the sensing surface 130a. The Fresnel lens 1131 for light emission may total reflect and refract a light generated by the light emitting unit 1110 so as to be incident to the sensing surface 130a.

The Fresnel lens 1131 for light emission may support total reflection to change a direction of the light output from the light emitting unit 210 up to maximally about 90 degrees. As such, in the light emitting unit 1110, an incident light that is parallel to the Fresnel lens 1131 for light emission may be concentrated into a first point "A" of the sensing surface 130a.

The Fresnel lens 1132 for light reception may be disposed above the light receiving unit 1120 (e.g., between the sensing surface 130a and the light receiving unit 1120). A tooth-shaped pattern surface of the Fresnel lens 1132 for light reception may be disposed to face the sensing surface 130a. The Fresnel lens 1132 for light reception may refract and total reflect the reflection light reflected by an external object (e.g., a body of the user) so as to be induced to the light receiving unit 1120. The Fresnel lens 1132 for light reception may allow a light reflected from a second point "B" of the sensing surface 130a to be spread on the whole area of the light receiving unit 1120.

When both the Fresnel lens 1131 for light emission and the Fresnel lens 1132 for light reception face the sensing surface 130a is illustrated in FIG. 11, but the disclosure is not limited thereto. One of the Fresnel lens 1131 for light emission and the Fresnel lens 1132 for light reception may be disposed to face the sensing surface 130a, and the other thereof may be disposed to face the light emitting unit 210 or the light receiving unit 220.

Figure 12:
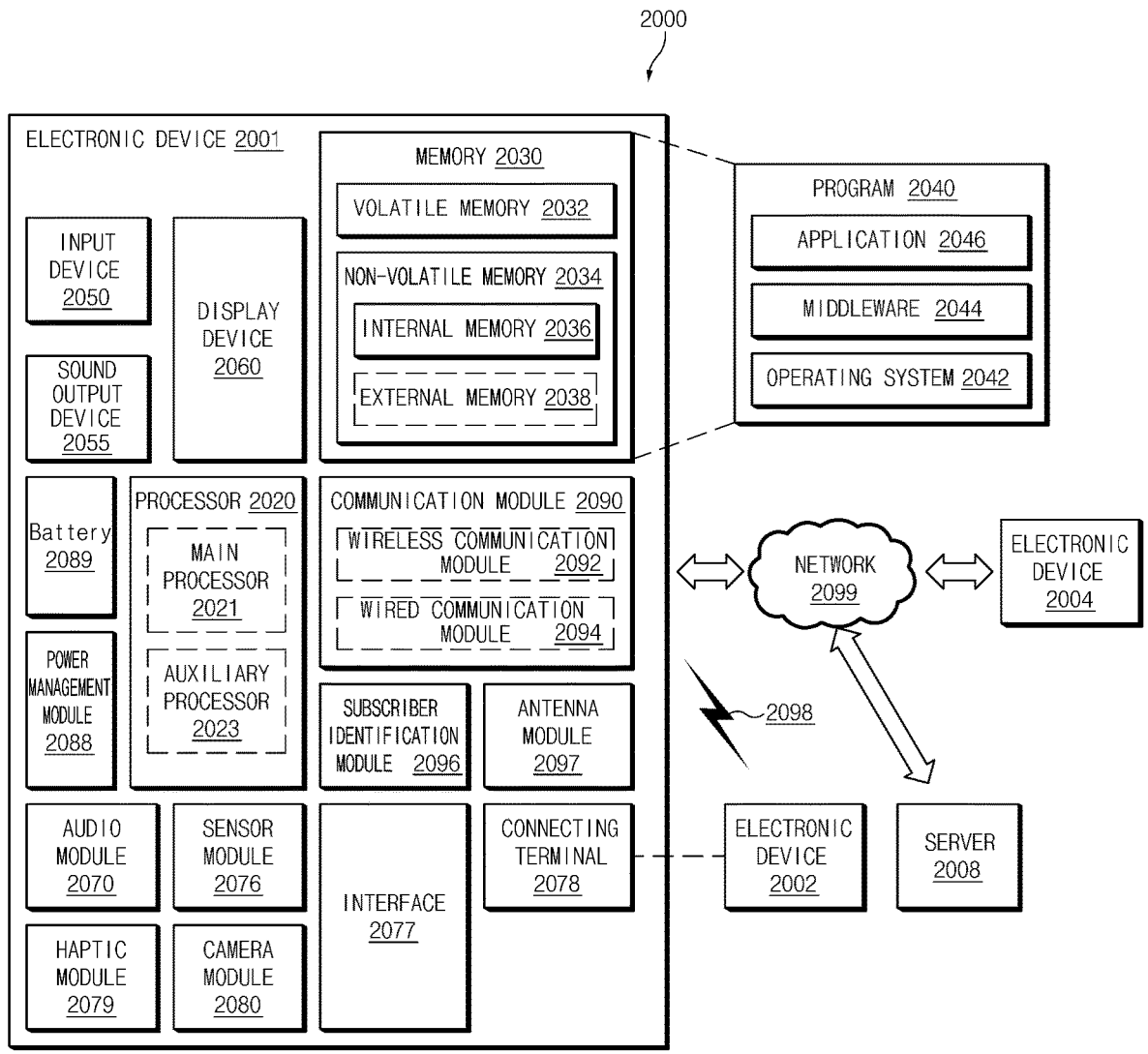
FIG. 12 is a diagram of an electronic device in a network environment, according to an embodiment.

FIG. 12 illustrates a block diagram of an electronic device 2001 in a network environment 2000, according to various embodiments. An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 12, under the network environment 2000, the electronic device 2001 (e.g., the electronic device 101) may communicate with an electronic device 2002 through local wireless communication 2098 or may communication with an electronic device 2004 or a server 2008 through a network 2099. According to an embodiment, the electronic device 2001 may communicate with the electronic device 2004 through the server 2008.

According to an embodiment, the electronic device 2001 may include a bus 2010, a processor 2020, a memory 2030, an input device 2050 (e.g., a micro-phone or a mouse), a display device 2060, an audio module 2070, a sensor module 2076, an interface 2077, a haptic module 2079, a camera module 2080, a power management module 2088, a battery 2089, a communication module 2090, and a subscriber identification module 2096. According to an embodiment, the electronic device 2001 may not include at least one (e.g., the display device 2060 or the camera module 2080) of the above-described elements or may further include other element(s).

The bus 2010 may interconnect the above-described elements 2020 to 2090 and may include a circuit for conveying signals (e.g., a control message or data) between the above-described elements. The processor 2020 may include one or more of a central processing unit (CPU), an application processor (AP), a graphic processing unit (GPU), an image signal processor (ISP) of a camera or a communication processor (CP). According to an embodiment, the processor 2020 may be implemented with a system on chip (SoC) or a system in package (SiP). For example, the processor 2020 may drive an operating system (OS) or an application to control at least one of another element (e.g., hardware or software element) connected to the processor 2020 and may process and compute various data. The processor 2020 may load a command or data, which is received from at least one of other elements (e.g., the communication module 2090), into a volatile memory 2032 to process the command or data and may store the result data into a nonvolatile memory 2034.

The memory 2030 may include, for example, the volatile memory 2032 or the nonvolatile memory 2034. The volatile memory 2032 may include, for example, a random access memory (RAM) (e.g., a dynamic RAM (DRAM), a static RAM (SRAM), or a synchronous DRAM (SDRAM)). The nonvolatile memory 2034 may include, for example, a one time programmable read-only memory (OTPROM), a programmable read-only memory (PROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 2034 may be configured in the form of an internal memory 2036 or the form of an external memory 2038 which is available through connection only if necessary, according to the connection with the electronic device 2001. The external memory 2038 may further include a flash drive such as compact flash (CF), secure digital (SD), micro secure digital (Micro-SD), mini secure digital (Mini-SD), extreme digital (xD), a multimedia card (MMC), or a memory stick. The external memory 2038 may be operatively or physically connected with the electronic device 2001 in a wired manner (e.g., a cable or a universal serial bus (USB)) or a wireless (e.g., Bluetooth) manner.

For example, the memory 2030 may store, for example, at least one different software element, such as a command or data associated with the program 2040, of the electronic device 2001. The program 2040 may include, for example, a kernel 2041, a library 2043, an application framework 2045 or an application program (interchangeably, "application") 2047.

The input device 2050 may include a microphone, a mouse, or a keyboard. According to an embodiment, the keyboard may include a keyboard physically connected or a virtual keyboard displayed through the display 2060.

The display 2060 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 2001.

The audio module 2070 may convert, for example, from a sound into an electrical signal or from an electrical signal into the sound. According to an embodiment, the audio module 2070 may acquire sound through the input device 2050 (e.g., a microphone) or may output sound through an output device (not illustrated) (e.g., a speaker or a receiver) included in the electronic device 2001, an external electronic device (e.g., the electronic device 2002 (e.g., a wireless speaker or a wireless headphone)) or an electronic device 2006 (e.g., a wired speaker or a wired headphone) connected with the electronic device 2001

The sensor module 2076 may measure or detect, for example, an internal operating state (e.g., power or temperature) of the electronic device 2001 or an external environment state (e.g., an altitude, a humidity, or brightness) to generate an electrical signal or a data value corresponding to the information of the measured state or the detected state. The sensor module 2076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 2076 may further include a control circuit for controlling at least one or more sensors included therein. According to an embodiment, the sensor module 2076 may be controlled by using the processor 2020 or a processor (e.g., a sensor hub) separate from the processor 2020. In the case that the separate processor (e.g., a sensor hub) is used, while the processor 2020 is in a sleep state, the separate processor may operate without awakening the processor 2020 to control at least a portion of the operation or the state of the sensor module 2076.

According to an embodiment, the interface 2077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 2078 may physically connect the electronic device 2001 and the electronic device 2006. According to an embodiment, the connector 2078 may include, for example, an USB connector, an SD card/MMC connector, or an audio connector (e.g., a headphone connector).

The haptic module 2079 may convert an electrical signal into mechanical stimulation (e.g., vibration or motion) or into electrical stimulation. For example, the haptic module 2079 may apply tactile or kinesthetic stimulation to a user.

The haptic module 2079 may include, for example, a motor, a piezoelectric element, or an electric stimulator.

The camera module 2080 may capture, for example, a still image and a moving picture. According to an embodiment, the camera module 2080 may include at least one lens (e.g., a wide-angle lens and a telephoto lens, or a front lens and a rear lens), an image sensor, an image signal processor, or a flash (e.g., a light emitting diode or a xenon lamp).

The power management module 2088, which is to manage the power of the electronic device 2001, may constitute at least a portion of a power management integrated circuit (PMIC).

The battery 2089 may include a primary cell, a secondary cell, or a fuel cell and may be recharged by an external power source to supply power at least one element of the electronic device 2001.

The communication module 2090 may establish a communication channel between the electronic device 2001 and an external device (e.g., the first external electronic device 2002, the second external electronic device 2004, or the server 2008). The communication module 2090 may support wired communication or wireless communication through the established communication channel According to an embodiment, the communication module 2090 may include a wireless communication module 2092 or a wired communication module 2094. The communication module 2090 may communicate with the external device (e.g., the first external electronic device 2002, the second external electronic device 2004, or the server 2008) through a first network 2098 (e.g. a wireless local area network such as Bluetooth or infrared data association (IrDA)) or a second network 2099 (e.g., a wireless wide area network such as a cellular network) through a relevant module among the wireless communication module 2092 or the wired communication module 2094.

The wireless communication module 2092 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 2092 supports cellar communication, the wireless communication module 2092 may, for example, identify or authenticate the electronic device 2001 within a communication network using the subscriber identification module (e.g., a SIM card) 2096. According to an embodiment, the wireless communication module 2092 may include a communication processor (CP) separate from the processor 2020 (e.g., an application processor (AP)). In this case, the communication processor may perform at least a portion of functions associated with at least one of elements 2010 to 2096 of the electronic device 2001 in substitute for the processor 2020 when the processor 2020 is in an inactive (sleep) state, and together with the processor 2020 when the processor 2020 is in an active state. According to an embodiment, the wireless communication module 2092 may include a plurality of communication modules, each supporting only a relevant communication scheme among cellular communication, local wireless communication, or a GNSS communication.

The wired communication module 2094 may include, for example, include a local area network (LAN) service, a power line communication, or a plain old telephone service (POTS).

For example, the first network 2098 may employ, for example, WiFi direct or Bluetooth for transmitting or receiving commands or data through wireless direct connection between the electronic device 2001 and the first external electronic device 2002. The second network 2099 may include a telecommunication network (e.g., a computer network such as a LAN or a WAN, the Internet or a telephone network) for transmitting or receiving commands or data between the electronic device 2001 and the second electronic device 2004.

According to various embodiments, the commands or the data may be transmitted or received between the electronic device 2001 and the second external electronic device 2004 through the server 2008 connected with the second network 2099. Each of the first and second external electronic devices 2002 and 2004 may be a device of which the type is different from or the same as that of the electronic device 2001. According to various embodiments, all or a part of operations that the electronic device 2001 will perform may be executed by another or a plurality of electronic devices (e.g., the electronic devices 2002 and 2004 or the server 2008). According to an embodiment, in the case that the electronic device 2001 executes any function or service automatically or in response to a request, the electronic device 2001 may not perform the function or the service internally, but may alternatively or additionally transmit requests for at least a part of a function associated with the electronic device 2001 to any other device (e.g., the electronic device 2002 or 2004 or the server 2008). The other electronic device (e.g., the electronic device 2002 or 2004 or the server 2008) may execute the requested function or additional function and may transmit the execution result to the electronic device 2001. The electronic device 2001 may provide the requested function or service using the received result or may additionally process the received result to provide the requested function or service. To this end, for example, cloud computing, distributed computing, or client-server computing may be used.

According to various embodiments, an electronic device (e.g., the electronic device 101 of FIG. 1A or 102 of FIG. 1B) includes a housing including a sensing surface, a light emitting unit configured to output a light to the outside through the sensing surface, a light receiving unit configured to collect a reflection light reflected from an external object being in contact with the sensing surface after being outputted from the light emitting unit; and a first Fresnel lens disposed between the light receiving unit and the sensing surface, wherein a first surface of the first Fresnel lens total reflects the reflection light introduced in a direction perpendicular to the sensing surface, and a second surface of the first Fresnel lens refracts the total reflected light so as to be introduced to the light receiving unit.

According to various embodiments, the first Fresnel lens includes a notch between a point corresponding to the light emitting unit and a point corresponding to the light receiving unit.

According to various embodiments, the first Fresnel lens further includes a support member configured to separate the notch.

According to various embodiments, a reinforcement material satisfying a specified light absorption rate is filled in the notch.

According to various embodiments, the first Fresnel lens includes one of poly methyl methacrylate (PMMA), acryl, and glass materials.

According to various embodiments, at least a portion of the first Fresnel lens includes a sawtooth shape, and the sawtooth shape protrudes toward the light receiving unit.

According to various embodiments, the sawtooth shape allows a light incident perpendicularly to the sensing surface to be total reflected at a first surface of a first distance from a center of the first Fresnel lens and the total reflected light to be refracted at a specified angle at a second surface of a second distance shorter than the first distance.

According to various embodiments, at least a portion of the first Fresnel lens includes a sawtooth shape, and the sawtooth shape protrudes toward the sensing surface.

According to various embodiments, the first Fresnel lens includes a convex lens shape in a central area aligned with the light receiving unit.

According to various embodiments, the first Fresnel lens is elongated between the light emitting unit and the sensing surface.

According to various embodiments, the electronic device further includes a second Fresnel lens disposed between the light emitting unit and the sensing surface.

According to various embodiments, the electronic device further includes a notch between the first Fresnel lens and the second Fresnel lens.

According to various embodiments, an electronic device (e.g., the electronic device 101 of FIG. 1A or 102 of FIG. 1B) includes a housing including a sensing surface, a light emitting unit configured to output a light to the outside through the sensing surface, a light receiving unit configured to collect a reflection light reflected from an external object being in contact with the sensing surface after being outputted from the light emitting unit; and a first Fresnel lens disposed between the light emitting unit and the sensing surface, wherein a first surface of the first Fresnel lens refracts the light generated from the light emitting unit, and a second surface of the first Fresnel lens total reflects the refracted light so as to be emitted to be perpendicular to the sensing surface.

According to various embodiments, the first Fresnel lens includes a notch between a point corresponding to the light emitting unit and a point corresponding to the light receiving unit.

According to various embodiments, the first Fresnel lens further includes a support member configured to separate the notch.

According to various embodiments, at least a portion of the first Fresnel lens includes a sawtooth shape, and the sawtooth shape protrudes toward the light emitting unit.

According to various embodiments, the sawtooth shape allows the light output from the light emitting unit to be refracted at a first surface of a first distance from a center of the first Fresnel lens and the light refracted at the first surface to be total reflected at a second surface of a second distance longer than the first distance.

According to various embodiments, at least a portion of the first Fresnel lens includes a sawtooth shape, and the sawtooth shape protrudes toward the sensing surface.

According to various embodiments, the first Fresnel lens includes a convex lens shape in a central area aligned with the light emitting unit.

According to various embodiments, the first Fresnel lens is elongated between the light receiving unit and the sensing surface.

An electronic device according to various embodiments of the disclosure may be equipped with an optical sensor using a Fresnel lens without an isolator between a light emitting unit and a light receiving unit, thus improving a transfer efficiency of photons.

The electronic device according to various embodiments of the disclosure may be equipped with a Fresnel lens at a light receiving unit to total reflect and refract an incident light, thus improving a transfer efficiency of photons. Accordingly, the performance of object recognition may be improved.

The electronic device according to various embodiments of the disclosure may be equipped with a Fresnel lens at a light emitting unit to total reflect and refract a light generated from the light emitting unit, thus improving a transfer efficiency of photons.

The electronic device according to various embodiments of the disclosure may include a notch structure in a peripheral area of a Fresnel lens, thus preventing the crosstalk.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a sensing surface;
a light emitting unit configured to output a light through the sensing surface;
a light receiving unit configured to collect a reflection light reflected from an external object in contact with the sensing surface, after the light is output from the light emitting unit; and
a first Fresnel lens disposed between the light receiving unit and the sensing surface,
wherein a first surface of the first Fresnel lens receives the reflection light into the first Fresnel lens, a second surface of the first Fresnel lens totally reflects the reflection light introduced in a direction perpendicular to the sensing surface, within the first Fresnel lens, and a third surface of the first Fresnel lens refracts the totally reflected light so as to be introduced to the light receiving unit,
wherein the first surface of the first Fresnel lens is parallel to the sensing surface,
wherein at least a portion of the first Fresnel lens includes a sawtooth shape,
wherein the sawtooth shape protrudes toward the light receiving unit,
wherein a separate isolator for light isolation is not placed between the light emitting unit and the light receiving unit,
wherein the first Fresnel lens includes a notch which is in a form of a circular groove surrounding the sawtooth shape, and
wherein the notch is filled with a reinforcement material satisfying a specified light absorption rate.

2. The electronic device of claim 1, wherein the first Fresnel lens further includes a support member configured to separate the notch.

3. The electronic device of claim 1, wherein the first Fresnel lens includes one of poly methyl methacrylate (PMMA), acryl, and glass materials.

4. The electronic device of claim 1, wherein the sawtooth shape allows a light incident perpendicularly to the sensing surface to be totally reflected at the second surface at a first distance from a center of the first Fresnel lens and the totally reflected light to be refracted at a specified angle at the third surface at a second distance shorter than the first distance.

5. The electronic device of claim 1, wherein the first Fresnel lens includes a convex lens shape in a central area aligned with the light receiving unit.

6. The electronic device of claim 1, wherein the first Fresnel lens is elongated between the light emitting unit and the sensing surface.

7. The electronic device of claim 1, further comprising a second Fresnel lens disposed between the light emitting unit and the sensing surface.

8. The electronic device of claim 7, wherein the notch is disposed between the first Fresnel lens and the second Fresnel lens.

9. An electronic device comprising:
a housing including a sensing surface;
a light emitting unit configured to output a light through the sensing surface;
a light receiving unit configured to collect a reflection light reflected from an external object in contact with the sensing surface, after the light is output from the light emitting unit; and
a first Fresnel lens disposed between the light emitting unit and the sensing surface,
wherein a first surface of the first Fresnel lens refracts the light output from the light emitting unit, a second surface of the first Fresnel lens totally reflects the refracted light within the first Fresnel lens so as to be emitted from the first Fresnel lens in a direction perpendicular to the sensing surface, and a third surface of the first Fresnel lens emits the reflected light from the first Fresnel lens,
wherein the third surface of the first Fresnel lens is parallel to the sensing surface,
wherein at least a portion of the first Fresnel lens includes a sawtooth shape,
wherein the sawtooth shape protrudes toward the light emitting unit,
wherein a separate isolator for light isolation is not placed between the light emitting unit and the light receiving unit,
wherein the first Fresnel lens includes a notch which is in a form of a circular groove surrounding the sawtooth shape, and
wherein the notch is filled with a reinforcement material satisfying a specified light absorption rate.

10. The electronic device of claim 9, wherein the first Fresnel lens further includes a support member configured to separate the notch.

11. The electronic device of claim 9, wherein the sawtooth shape allows the light output from the light emitting unit to be refracted at the first surface at a first distance from a center of the first Fresnel lens and the light refracted at the first surface to be totally reflected at the second surface at a second distance longer than the first distance.

12. The electronic device of claim 9, wherein the first Fresnel lens includes a convex lens shape in a central area aligned with the light emitting unit.

13. The electronic device of claim 9, further comprising a second Fresnel lens disposed between the light receiving unit and the sensing surface.

* * * * *